(12) United States Patent
Basques

(10) Patent No.: US 10,034,549 B1
(45) Date of Patent: Jul. 31, 2018

(54) FOOTSTOOL AND A METHOD FOR MAKING

(71) Applicant: Marcos Gois Basques, Dearborn, MI (US)

(72) Inventor: Marcos Gois Basques, Dearborn, MI (US)

( * ) Notice: Subject to any disclaimer, the term of this patent is extended or adjusted under 35 U.S.C. 154(b) by 0 days.

(21) Appl. No.: 15/676,242

(22) Filed: Aug. 14, 2017

(51) Int. Cl.
  *A47C 16/02* (2006.01)
  *A47C 5/12* (2006.01)
  *B29C 69/00* (2006.01)

(52) U.S. Cl.
  CPC ............. *A47C 16/02* (2013.01); *A47C 5/125* (2013.01); *B29C 69/00* (2013.01)

(58) Field of Classification Search
  CPC .......... A47C 16/02; A47C 5/125; B29C 69/00
  USPC ............ 297/423.41, 423.39, DIG. 1, 423.44, 297/423.45, 423.46, 451.11, 452.57; 16/37
  See application file for complete search history.

(56) References Cited

U.S. PATENT DOCUMENTS

| | | | | |
|---|---|---|---|---|
| 3,002,789 A * | 10/1961 | Brown | ..................... | A47C 3/16 24/129 R |
| 3,139,632 A * | 7/1964 | Johns | ..................... | A47C 16/00 190/35 |
| 3,641,701 A * | 2/1972 | Rosenfeld | .............. | A63H 33/06 446/111 |
| 6,364,416 B1* | 4/2002 | Rheault | ..................... | A47C 3/16 297/423.41 |
| 6,969,119 B1* | 11/2005 | Jennings | ................ | A47C 16/02 297/119 |
| 7,997,216 B2* | 8/2011 | Thornbury | .............. | A47B 37/04 108/157.1 |
| 2004/0251720 A1* | 12/2004 | Micheletti | ................ | A47C 1/13 297/228.1 |
| 2005/0073182 A1* | 4/2005 | Brown | ..................... | A47C 9/00 297/181 |
| 2012/0267938 A1* | 10/2012 | LaRoche | .................. | A47C 3/16 297/452.48 |

* cited by examiner

*Primary Examiner* — Milton Nelson, Jr.
(74) *Attorney, Agent, or Firm* — LeClairRyan

(57) ABSTRACT

A footstool comprising a solid expanded polystyrene foam inner core with a plurality of foam side panels secured to the inner core. The footstool also comprises a foam top member secured to a top surface of the inner core and a cover material arranged over the plurality of side panels and the top member. The footstool further comprises a first base member in contact with the bottom surface of the inner core and a second base member in contact with the first base member and in contact with the cover material. The footstool is lightweight, easy to manufacture and low in cost.

19 Claims, 8 Drawing Sheets

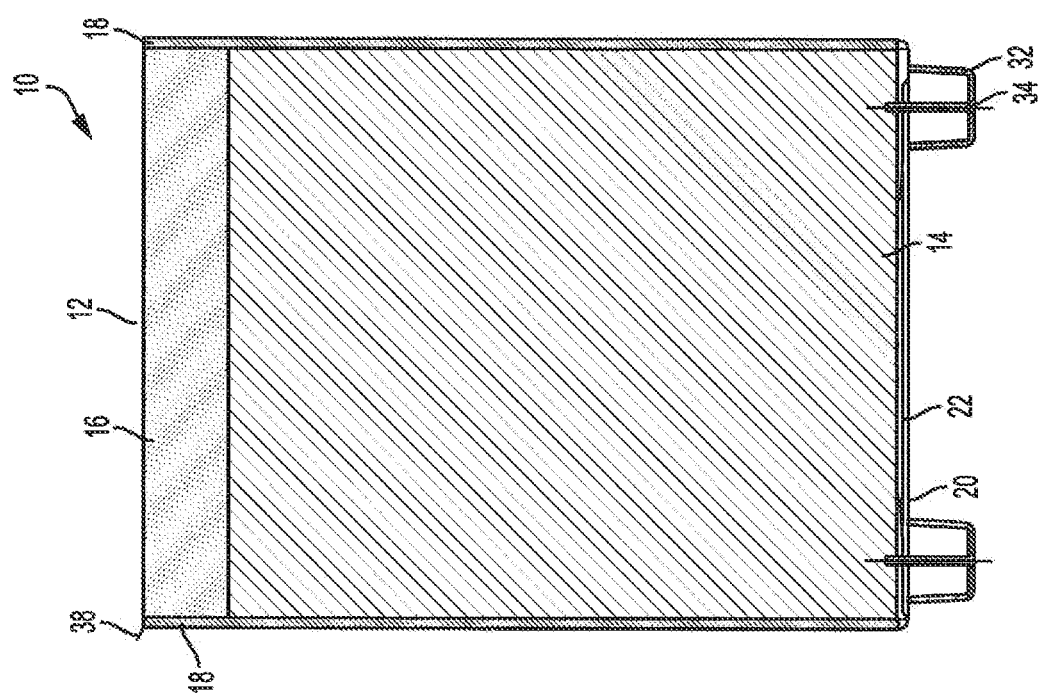
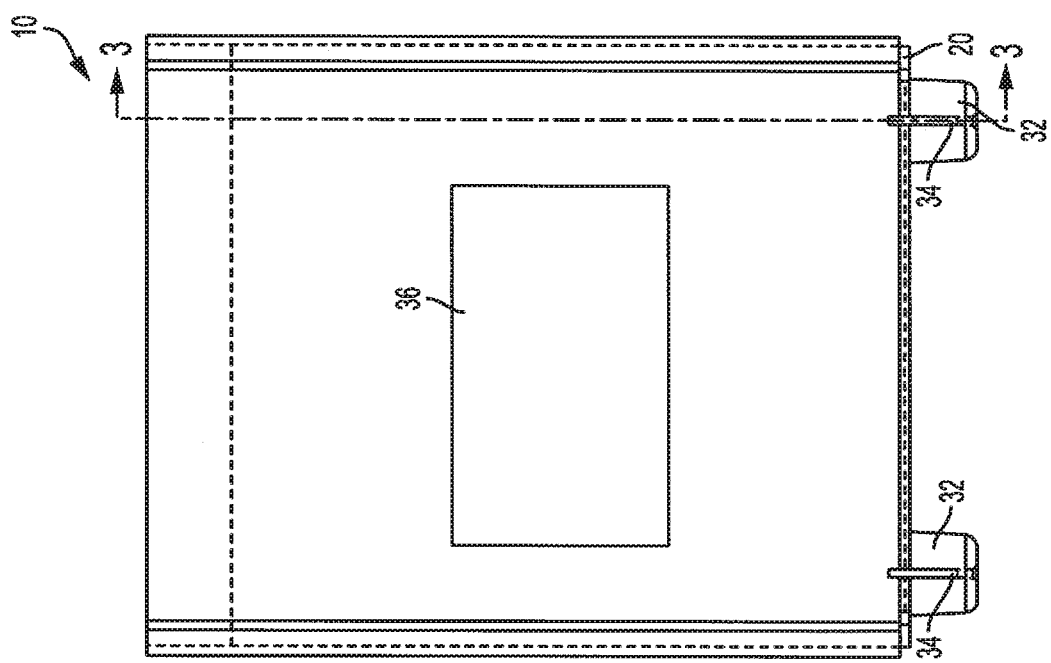

FOOTSTOOL AND A METHOD FOR MAKING

BACKGROUND OF INVENTION

1. Field of the Invention

The present invention generally relates to footstools and Ottomans and more particularly relates to a footstool made of light weight materials that is capable of having a customized design arranged on an outer cover thereof.

2. Description of Related Art

Footstools and Ottomans are well known in the art. Many of these prior art footstools that are well known in the art have various designs. Generally, the prior art footstools are manufactured with wood, heavy materials and non-renewable raw materials that may in the long run hurt the environment. The use of woods and other heavy materials may make footstools cumbersome, hard to move and generally kept in one place because of the effort needed to move the footstool to different locations. Furthermore, with the use of woods, other heavy materials and non-renewable materials to create prior art footstools many of these footstools are not capable of getting wet or being used in an outdoor environment as sun and rain may damage the footstool during outdoor use thereof.

Therefore, there is a need in the art for an improved footstool that is made of ecologically friendly materials, which are lighter than the materials used in prior art footstools and is made of materials that are capable of having slogans, designs or words imprinted on an outer surface thereof in order to make any known design for a footstool. There also is a need in the art for a footstool that is easy to manufacture and lower in costs than the footstool known in the prior art. There also is a need in the art for a footstool that is capable of both indoor/outdoor use and for use by any size person. There also is a need in the art for a footstool that may be customized to a buyer's exact needs to include any known picture, design, words, slogans, or the like arranged on all, some or just one of the outer surfaces of the footstool according to the present invention. There also is a need in the art for a footstool that may have optional straps, rollers or pockets arranged on a surface thereof to allow for easy maneuverability of the footstool. There also is a need in the art for an improved footstool that is capable of being completely recycled when the useful life of the footstool has ended. There also is a need in the art for an improved footstool that is water proof such that the footstool may be used in both an indoor and outdoor setting.

SUMMARY OF THE INVENTION

One object of the present invention may be to provide a novel and unique footstool.

Another object of the present invention may be to provide a footstool that is made of lightweight materials wherein all of the materials used therein are recyclable after the useful life of the footstool has ended.

Still another object of the present invention may be to provide a footstool that uses a high density expanded polystyrene foam, such as Styrofoam, for its core to ensure for better structural integrity and for a lightweight footstool.

Still another object of the present invention may be to provide a lightweight plastic two piece base for use with a footstool.

Still another object of the present invention may be to use an outer cover material that is waterproof, thus allowing for the footstool to be used both indoors and outdoors.

Still another object of the present invention may be to provide a footstool that has at least one pocket for storage, straps which allow for easy movement of the footstool and may include rollers arranged on a bottom surface thereof to allow for quick and easy maneuverability of the footstool to different locations both indoors and outdoors.

Another object of the present invention may be to provide a footstool that is easier to manufacture and lower in costs.

Another object of the present invention may be to provide a footstool that is completely customizable by allowing the purchaser to arrange any predetermined design, picture, slogan or words on one or more outer surfaces of the footstool thus creating a unique and customized footstool for use by the consumer.

According to the present invention, the foregoing and other objects and advantages are obtained for a novel design for a footstool and a method for making thereof. The footstool may comprise a solid expanded polystyrene foam inner core and a plurality of foam side panels secured to the inner core. The footstool may further comprise a foam top member secured to a top surface of the inner core and a cover material arranged over the plurality of side panels and the top member. The footstool may also comprise a first base member in contact with the bottom surface of the inner core and a second base member in contact with the first base member and in contact with the cover material. The footstool is made of recyclable materials that are all lightweight thus creating a lightweight footstool that is also easily customizable by allowing a heat pressure process to place any predetermined design, picture, letters, logo or the like on at least one outer surface of the footstool according to the present invention.

One advantage of the present invention may be that it provides a novel and unique footstool and method of making thereof.

Yet another advantage of the present invention may be that it provides a footstool that is lightweight, easy to manufacture and low cost.

Still another advantage of the present invention may be that it provides a footstool that uses an inner core made of a high density expanded polystyrene foam, such as Styrofoam, which allows for better structural integrity of the footstool.

Still another advantage of the present invention may be that it provides a lightweight two piece base for use on the footstool.

Still another advantage of the present invention may be that it provides a footstool that has a waterproof cover material arranged thereover, thus allowing the footstool to be used in both indoor and outdoor settings.

Still another advantage of the present invention may be that it provides a footstool that may have pockets for storage, straps for ergonomic handling thereof and rollers used on a bottom surface thereof instead of feet to allow for easy maneuvering of the footstool by the consumer.

Still another advantage of the present invention may be that it provides a footstool that is easy to recycle into scrap material after expected use thereof ends.

Still another advantage of the present invention may be that it provides for a footstool that is easily customizable to include any predetermined design, picture, slogan, words or the like on an outer surface thereof.

Still another advantage of the present invention may be that it provides a footstool that replaces all the heavy materials of prior art footstool with new ecological lightweight materials, thus creating a lightweight easy to use footstool for a consumer.

Other objects, features and advantages of the present invention may become apparent from the subsequent description and appended claims taking in conjunction with the accompanying drawings.

BRIEF DESCRIPTION OF THE DRAWINGS

FIG. 2 shows a perspective side view of a footstool according to the present invention.

FIG. 3 shows a cross sectional view taken along line 3-3 of FIG. 2 according to the present invention.

DESCRIPTION OF THE EMBODIMENT(S)

Figure 1:
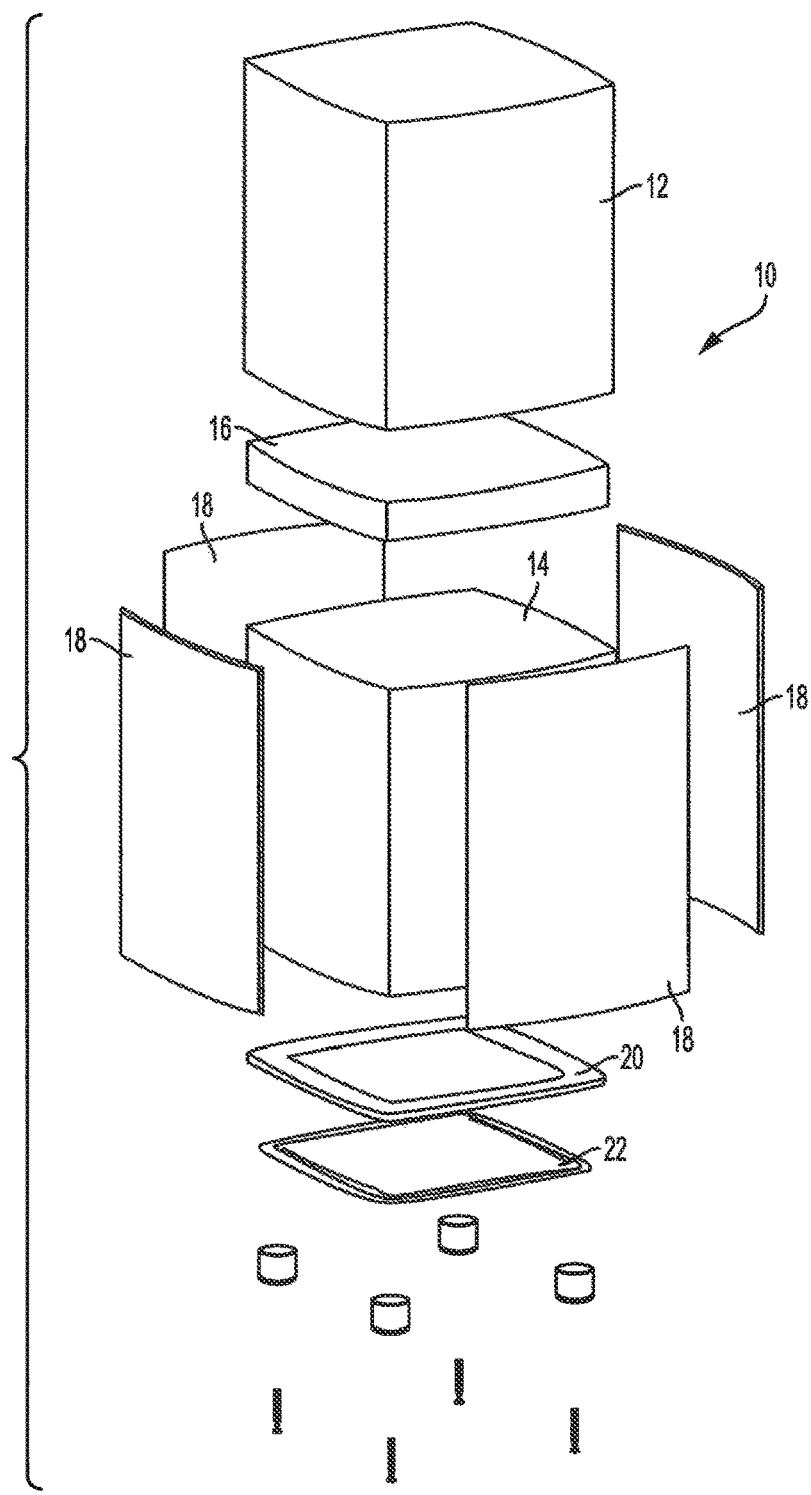
FIG. 1 shows an exploded view of a footstool according to the present invention.
Figure 4:
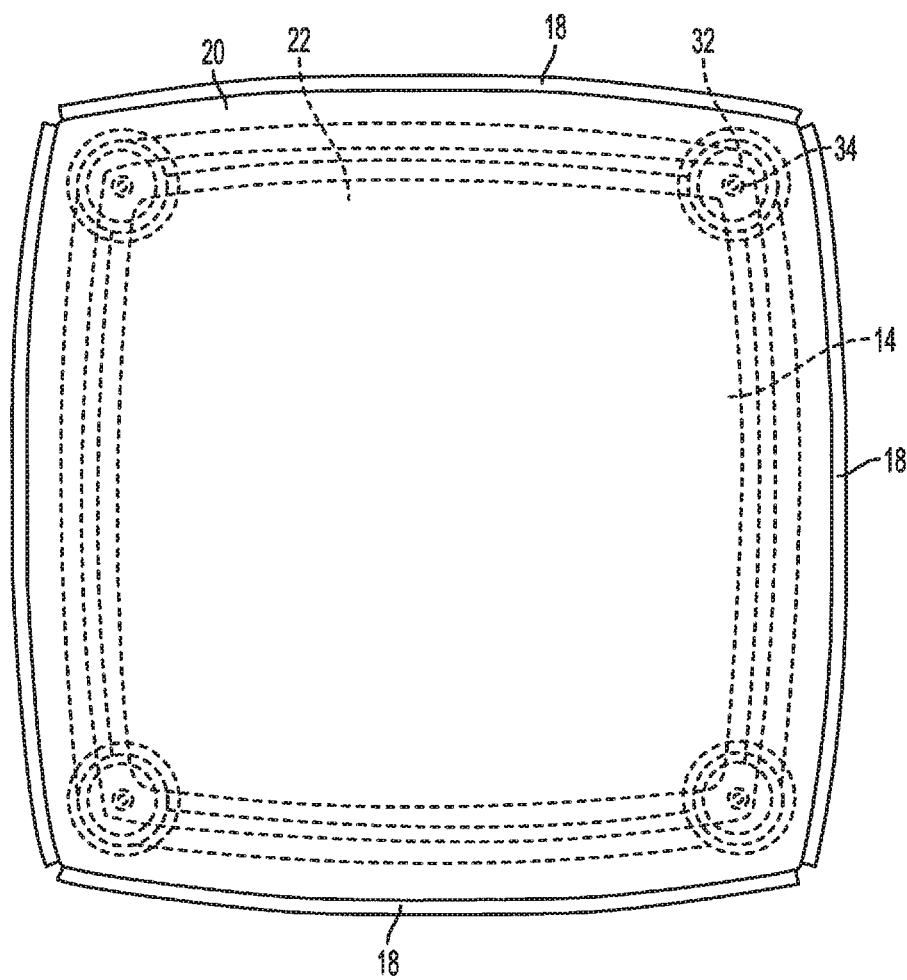
FIG. 4 shows a perspective bottom view of a footstool according to the present invention.
Figure 5:
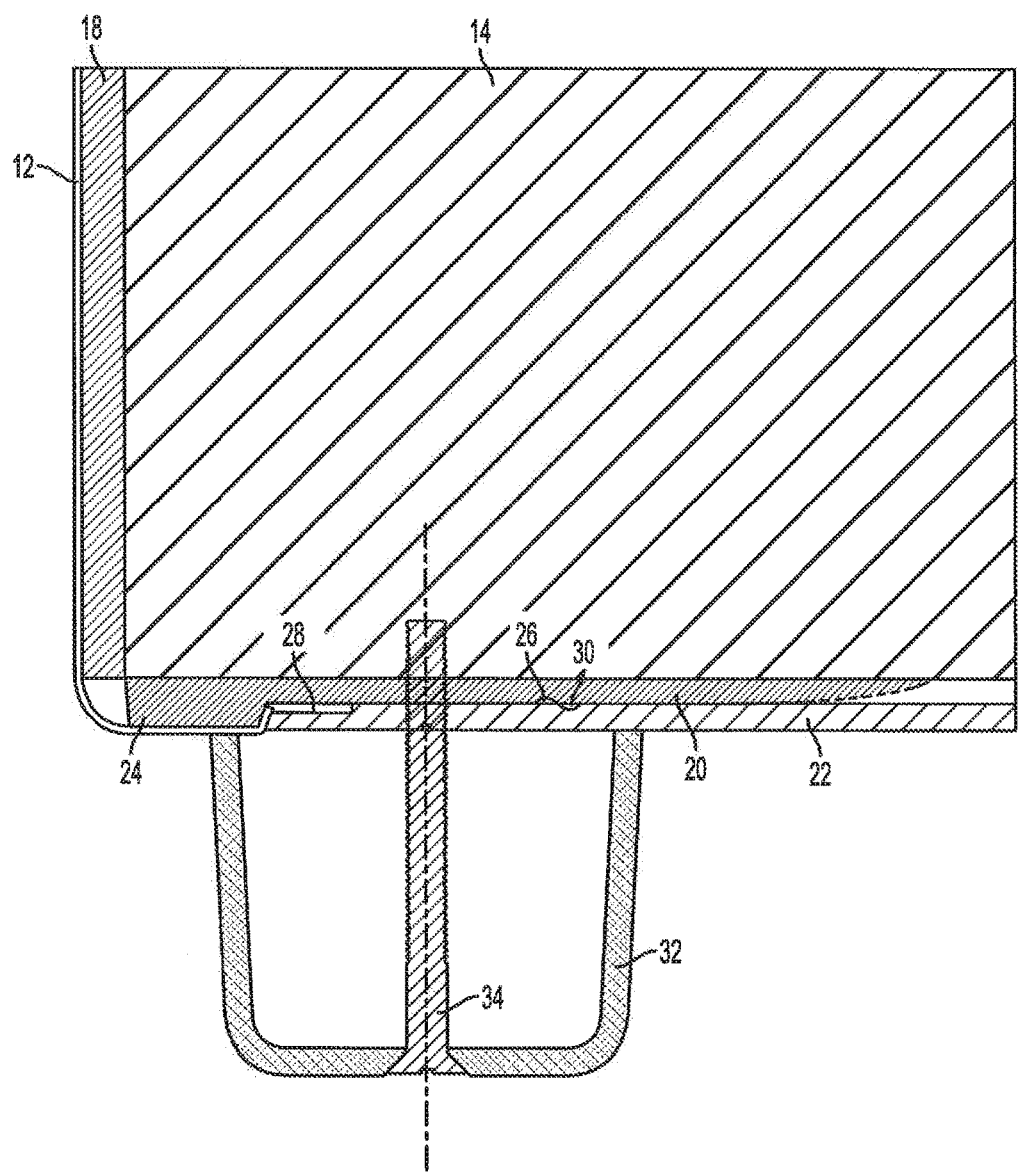
FIG. 5 shows a close up cross sectional view of the footstool according to the present invention.
Figure 6:
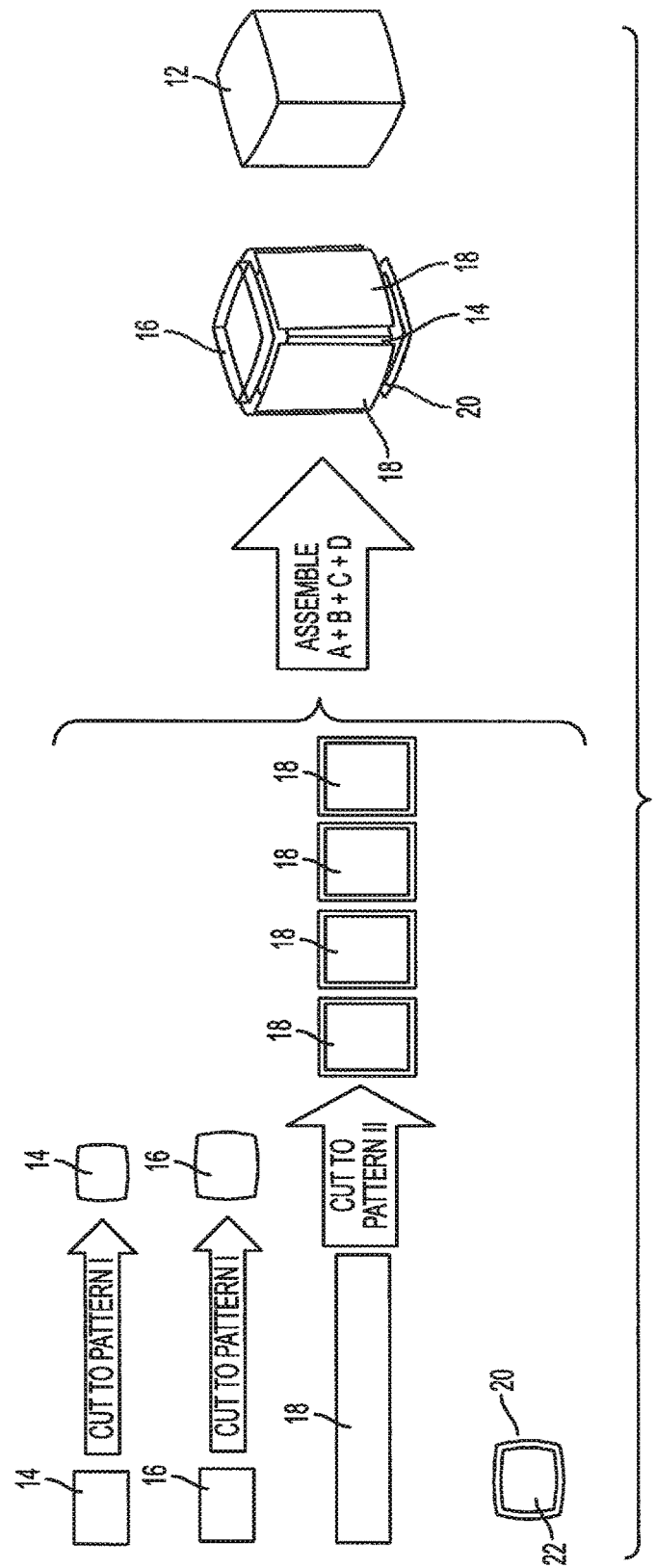
FIG. 6 shows a methodology of making an interior structural sub-assembly for the footstool according to the present invention.
Figure 7:
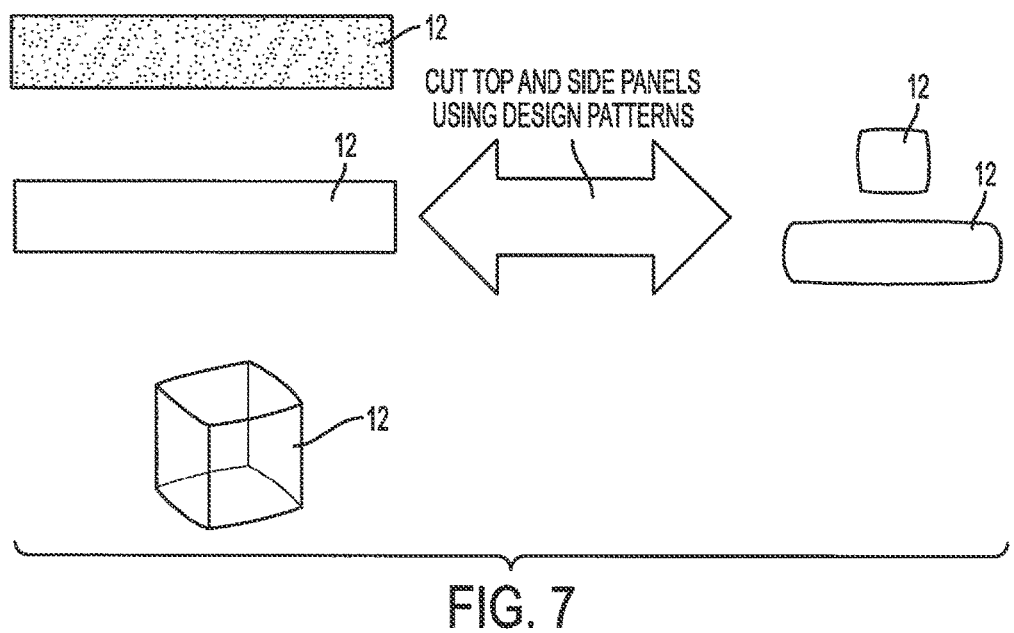
FIG. 7 shows a methodology of making an exterior shell for use with the footstool according to the present invention.
Figure 8:
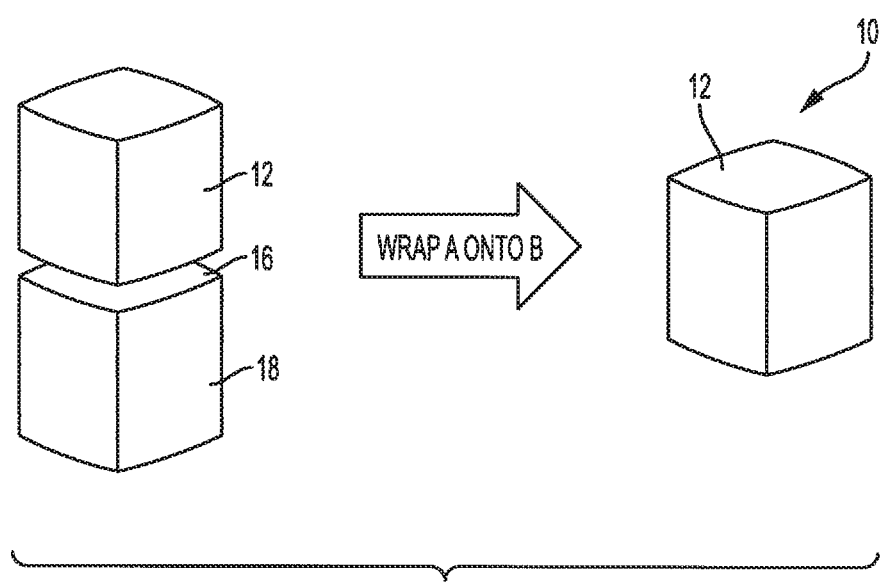
FIG. 8 shows a sub assembly for the footstool according to the present invention.
Figure 9:
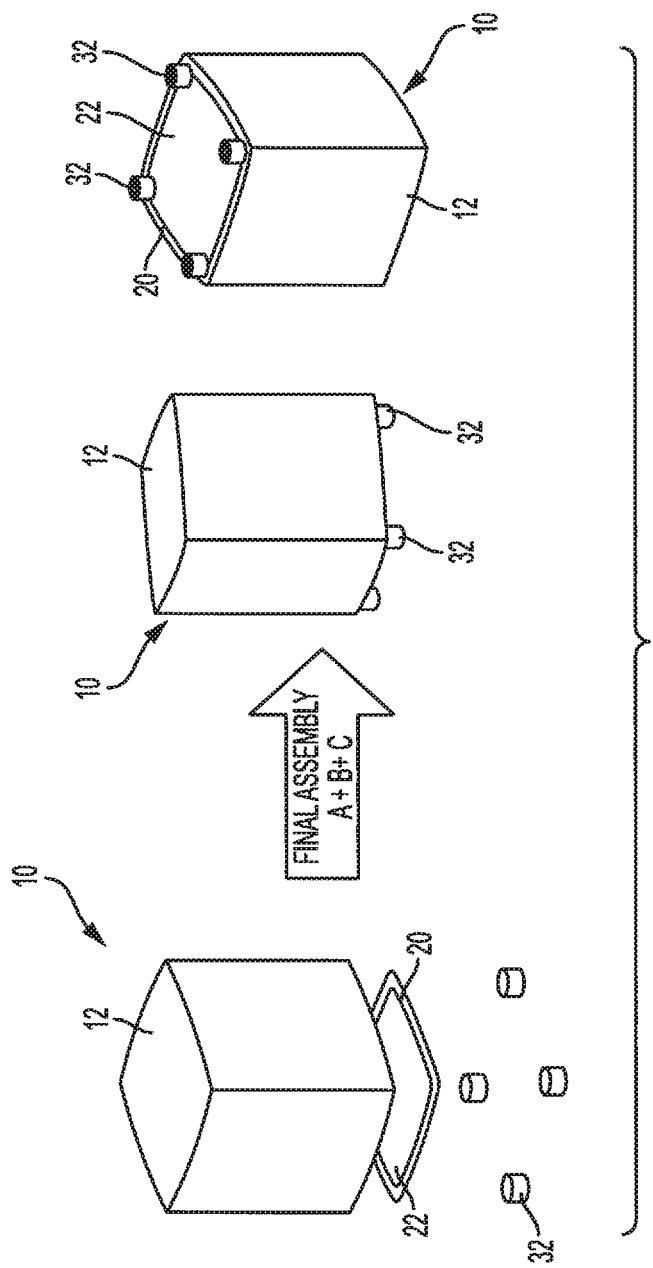
FIG. 9 shows a methodology of the final assembly for a footstool according to the present invention.

Referring to the drawings, a footstool 10 and a method of making thereof that is lightweight and capable of being used both indoors and outdoors is shown. It should be noted that the footstool 10 is made of any known lightweight materials that are also recyclable, thus creating an ecological and an ergonomical designed footstool 10 that may be reduced to scrap material for recycling purposes at the end of the useful life of the footstool 10 according to the present invention. It should be noted that prior art footstools which are well known in the art generally were made and manufactured with wood, other heavy materials or other non-renewable raw materials that may hurt the environment if their use continues. Therefore, the footstools 10 and method of making thereof was developed to create a lightweight footstool 10 that may use expanded polystyrene foam or D28 foam as replacement for wood and any other heavy material supports in the prior art footstools, thus creating a footstool 10 that is lighter and ecologically viable for consumers. It should further be noted that the materials used in the lightweight footstool 10 of the present invention may have an exterior or outer cover material 12 that is resistant or waterproof to water thus allowing the footstool 10 to be both an indoor and outdoor use footstool 10 that is lightweight, easy to move, store, or even take on road trips or vacations because of the design of the footstool 10. It should further be noted that the footstool 10 of the present invention may also be completely customizable in that the outer cover material 12 or the exterior shell of the footstool 10 is capable of having any known design, picture, logo, words or the like, heat pressed thereon and permanently affixed to an outer surface or surfaces thereof. This may allow for completely customizable footstools 10 to be purchased by consumers and recycled in an ecological manner after the useful life of the footstool 10 has expired.

The footstool 10 of the present invention includes a solid cube like inner core 14 surrounded by a top foam member or panel 16 and four side foam members or panels 18 arranged on the top and side surfaces of the inner core 14, respectively. In one contemplated embodiment, the inner core 14 has the form of a solid cube and may have the dimensions of approximately 40 cm by 40 cm by 40 cm, however it should be noted that any other dimensions from 2 cm up to 500 cm may also be used for the inner core 14 of the footstool 10 according to the present invention. It should further be noted that while a solid cube is contemplated for use for the inner core 14 any other shape, such as a rectangular type cube, a circular or cylindrical type shape, a triangular shape or any other known shape or random shape may be used for the inner core 14 of the footstool 10 according to the present invention. However, in the drawings shown, a solid cube is used for the inner core 14 according to a design of the present invention. It should be noted that in one contemplated embodiment the solid cube is made of a high density expanded polystyrene foam, such as a Styrofoam material, however it may be made of any other type of lightweight high density plastic, ceramic, metal or natural material, etc. The inner core 14 may be high density, solid and lightweight. It should further be noted that it is also contemplated to use a hollow core cube for the inner core 14 of the present invention in an alternate embodiment. The solid cube inner core 14 may have a top surface, four side surfaces and a bottom surface. As noted above, arranged on the top surface and the four side surfaces of the inner core 14 are a top member 16 and a plurality of side members 18. The top member 16 may be arranged and secured to the top surface of the inner core 14 while one side member 18 may be arranged on each side surface of the inner core 14, respectively. In one contemplated embodiment, the top member 16 may be made of a high density foam and generally have the dimensions of approximately 40 cm by 40 cm by 5 cm. The side members 18 generally may be made from a medium density foam and have the dimensions of approximately 40 cm by 40 cm by 0.5 cm. It should be noted that any other dimensions may be used for the top panel or member 16 and the side panels or members 18 and that any other type of foam from low to very high density may be used for either the top member 16 or the side members 18. It should further be noted that in one contemplated embodiment a D28 foam is the foam of choice for both the side members 18 and the top members 16. It is contemplated in one embodiment to secure the top foam member 16 and the side foam members 18 to their respective top and side surfaces of the inner core 16 by any known adhesive, such as any known glue, tape, hook and line fasteners, or any other known chemical or mechanical techniques such as but not limited to screws, pushpins or the like, etc. The attaching of the side foam members 18 and the top foam member 16 to the inner core 14 may create an interior structure for the footstool 10 that is both lightweight and comfortable for use as a footstool, seat or table by the consumer.

The footstool 10 of the present invention may also include a two piece base member. The two piece base member may comprise a first base member 20 and a second base member 22 which interengage and/or interact with one another. It should be noted that the first base member 20 and the second base member 22 in one contemplated embodiment are made of a lightweight plastic material, however it should be noted that any other lightweight material, such as any known rubber, composite, ceramic, metal or natural material may be used to form and manufacture the two piece base member. The first base member 20 may have a generally square like ring shape, however it may be noted that any other shape may be used for the first base member 20, such as a circumferential ring shape, triangular ring shape, or any other known, unknown or random shape for the first base member 20. The first base member 20 may have a square like shaped body with an inner generally square shaped orifice. The first base member 20 may have a generally flat top surface and a bottom surface that is generally flat, but also includes a lip 24 arranged around the entire outer circumference of the first base member 20. The lip 24 may generally extend a predetermined distance from the bottom surface of the first base member 20. It should also be noted that a channel 26 may be arranged around an entire portion of the bottom surface in a generally square like shape, of the first base member 20. The channel 26 may be used to receive a chemical compound therein, such as a glue or adhesive, for use in securing the first base member 20 to the second base member 22 to create a solid base made out of two pieces as described herein. In one contemplated embodiment, the first base member 20 may have dimensions of approximately 40 cm by 40 cm with a thickness of approximately 6 mm. The 6 mm thickness may occur where the lip 24 extends from the bottom surface thereof. The other portions of the first base member 20 may have a thickness of approximately 3 mm. It should be noted that any other dimensions may be used for both the first base member 20 and the second base member 22 of the footstool 10 according to the present invention. Therefore, the lip 24 may extend from, along or near the outer edge of a bottom surface of the first base member 20. The inner edge of the lip 24 may be a predetermined angle arranged thereon. The angle may be within the range of zero to 180°. It is also contemplated to use a plurality of braces and bars to extend across the width or length of the inner orifice of the first base member 20 in order to create a more robust first base member 20. The footstool 10 of the present invention also may include a second base member 22 which generally has a square like shape. However, it should be noted that any shape which may mimic that of the inner core 14 may be used, thus any other known shape, such as any rectangular, triangular, trapezoidal, circular, star shape, random shape, known or unknown shape may also be used for the second base member 22 according to the present invention. The second base member 22 may generally have a flat bottom surface and a flat top surface wherein a notch 28 is arranged around the outer circumference of the top surface of the second base member 22. The notch 28 may have any known dimension. In one contemplated embodiment, the second base member 22 may have approximate 3 mm thickness, the same as that for the majority of the first base member 20. It should further be noted that a channel 30 may also be arranged in a top surface of the second base member 22 to allow for glue or any other adhesive to be placed therein to help secure the second base member 22 to the first base member 20 to ensure a solid base for the footstool 10. Generally, an angle on the outer edge of the second base member 22 may mimic and/or mate with the angle of the inner edge surface of the lip 24 of the first base member 20. Hence, when the second base member 22 is placed within the pocket formed by the lip 24 of the first base member 20, it may create a secure connection therebetween via an interference or press fit to the first base member 20. It should be noted, as shown in the drawings, that an outer cover material 12 may be arranged between the lip 24 of the first base member 20 and the outer edge and/or notch 28 of the second base member 22, thus securing the outer cover material 12 for the footstool 10 between a surface of the second base member 22 and a surface of the first base member 20. Hence, ensuring an aesthetically pleasing look for the footstool 10 with regards to the exterior cover material 12 arranged over the top thereof. It should further be noted that it is also contemplated to place glue in both channels 28, 30 of the first base member 20 and the second base member 22 to further secure the first base member 20 to the second base member 22 thus increasing the interaction and hold between the two members such that the interference fit along with the glue or adhesive may create a secure connection therebetween thus allowing for a strong and robust base for the footstool 10. It should be noted that the dimensions of the second base member 20 may be approximately 38 cm by 38 cm with a thickness of approximately 3 mm as described above. It should be noted that the dimensions of the second base member 22 may be as such that the second base member 22 may fit and interact with and interengage within the pocket formed by the lip 24 of the first base member 20, thus allowing for a secure connection therebetween. Therefore, any known dimensions may be used for the second base member 22 as long as they mate with and interact with the appropriate dimensions of the first base member 20.

It should further be noted that the first base member 20 has its top surface secured to the bottom surface of the inner core 14. In one contemplated embodiment the first base member 20 is secured by any known glue or adhesive arranged between the bottom surface of the inner core 14 and the top surface of the first base member 20. However, it should also be noted that any other known chemical fastening technique or mechanical fastening technique may also be used to secure the first base member 20 to the bottom surface of the inner core 14.

As described above, the completed footstool 10 of the present invention may include an exterior or outer cover material 12 arranged over a preassembled subassembly. In one contemplated embodiment, the outer cover material 12 may be in contact with the top foam member 16 and the side foam members 18 of the footstool 10 and also with the first base member 20 and second base member 22 of the footstool 10 according to the present invention. The outer cover material 12 may be made of any known material that is waterproof or water resistant, thus allowing for the footstool 10 to be both usable in an indoor environment and/or outdoor environment. In one contemplated embodiment the outer cover material 12 may be a short nap micro suede material that is capable of receiving artwork thereon. It should be noted that any other type of plastic, polyester, natural material, composite, or metal may be used for the exterior cover material 12 according to the present invention. It should be noted that during manufacturing of the outer cover material 12 for the footstool 10, a fabric design may be applied directly to the outer surface of the outer cover material 12 through a heat press process. It should be noted that any other type of process that is capable of permanently applying any known artwork, such as any known picture, words, logos, or any other design to the outer surface of the footstool 10 according to the present invention. After the artwork has been applied through a heat press process or other methodology to the outer surface of either the side surface fabric or the top surface fabric, the manufacturing process for the footstool 10 may connect and secure the side fabric to the top fabric by a sewing process. In one contemplated embodiment the side fabric may be a rectangular shape that may extend around the entire outer periphery of the footstool 10 and have just one seam along one corner edge thereof. The top portion of the outer cover material 12 may generally have a square shape that mimics the top of the inner core 14 or top foam member 16 of the footstool 10. During the manufacturing process the side seam may be sewn first thus creating a generally square like band once the side seam is made, then the top seam may be made to secure to a top portion of the side fabric thus creating a generally bag like exterior shell or an outer cover material 12 having one open end thereof. It should be noted that the dimensions of the side fabric/material for the exterior cover material 12 may be such that it extends a predetermined distance below the bottom edge of the inner core 14 of the footstool 10 a predetermined distance. In one contemplated embodiment, the extension may be approximately 2½ to 10 cm beyond the bottom edge of the footstool 10 on all four side surfaces thereof. This may allow for the bag shaped outer cover material 12 to be folded over the lip 24 of the first base member 20 and then held in place via the interference fit between the first base member 20 and the second base member 22 hence, the exterior cover material 12 may be pinched and sandwiched between the first base member 20 and the second base member 22 thus allowing for a taut and ergonomically pleasing outer surface for the footstool 10. As noted above, a design may be arranged on one of the side surfaces or top surface of the footstool 10 or may be arranged on all five outer surfaces of the footstool 10 depending on the consumer. The inner diameter of the bag like cover material 12 may be such that it creates a snug and aesthetically pleasing fit over the top foam member 16 and side foam members 18, which are attached to the inner core 14 of the footstool 10. As noted above, the outer cover material 12 may be held in place via a locking mechanism arranged between the first and second base member 20, 22. It is also contemplated to use a chemical fastening material, such as a glue and adhesive to further secure the outer cover material 12 to the footstool 10. The fabric for the outer cover material 12 is cut into its respective shapes for all four sides and the top member and then after the heat press process puts any design on the outer surfaces thereof the side fabric and the top fabric may be sewn as described above. During manufacturing of the footstool 10, the bag like outer cover material 12 may be arranged over the footstool 10 and secured to the base member as described above.

As noted above, during assembly the first base member 20 may be arranged and secured to the bottom surface of the inner core 14 and then the exterior cover material 12 may be arranged over the footstool 10. Next, the second base member 22 may be secured within and to the first base member 20 thus securing the outer cover member 12 in an aesthetically pleasing manner to the footstool 10. In one contemplated embodiment, a plurality of feet 32 may be arranged into a bottom surface of the footstool 10. In one contemplated embodiment, four feet may be arranged one at each corner of the bottom surface of the footstool 10. It should be noted in the embodiment shown, a generally cylindrical or circular shaped foot 32 may be arranged at each corner of the base of the bottom surface of the footstool 10. However, any other known shaped foot 32 may also be used depending on the design requirements of the footstool 10. It should be noted that generally the feet 32 may be made of a plastic material, however any other light weight ceramic, composite, plastic, natural material or metal may be used to create and mold the feet 32. In the embodiment shown, each of the feet 32 may have an orifice arranged at a mid point thereof which may be used to receive a fastener 34 therethrough. In one contemplated embodiment, the fastener 34 may be a screw that may be arranged through the orifice at a midpoint of the foot 32 and then secured into and in contact with both the second base member 22, the first base member 20, and the inner core 14 of the footstool 10. It should be noted that it is contemplated to pre-drill orifices through the first base member 20, second base member 22 and inner core 14 at a position where the fasteners 34 may be arranged through the feet to create precise and secure connections between the feet 32 and the footstool 10. However, it is also contemplated to mark with a dimple or notch on the first base member 20, second base member 22 and bottom surface of the core 14 thus allowing for a predetermined dimple to exist to allow for easy location of the screw 34 and then a secure connection between the screw 34 holding the foot 32 onto the bottom surface of the footstool 10. It should also be noted that it is contemplated that any other chemical fastening technique and mechanical fastening technique may be used to secure the feet 32 to the bottom surface of the footstool 10 such as gluing, adhesives, nails, push pins or the like, etc. It should further be noted that any number of feet 32 may be used however, in the embodiment shown only four are used, but any number from zero up to twenty may be used depending on the size and design requirements of the footstool 10. It should also be noted in another contemplated embodiment, roller feet may be used instead of the fixed feet as described and shown in the drawings.

It is also contemplated to have an optional pocket 36 sewn on any of the side surfaces of the outer cover 12 of the footstool 10. It is also contemplated to use multiple pockets 36 arranged on multiple outside surfaces or the top surface of the footstool 10 depending on the consumers tastes and likes. Furthermore, it should be noted that it is also contemplated to use at least one strap or a plurality of straps 38 arranged at predetermined positions either at the seams or on a side or top surface of the outer cover 12 in order to create an easier to move footstool 10 that is capable of being grabbed by only one strap or multiple straps and moved to a predetermined or different location. It should be noted that it is contemplated to sew any optional pockets 36 and/or optional straps 38 directly onto the exterior cover material 12 of the present invention. It should also be noted that any other known chemical fastening technique or mechanical fastening technique may be used to secure the optional strap 38 or pocket 36 onto the outer cover 12 of the present invention. Therefore, during the manufacturing process the initial inner core 14 may be formed and then the top foam member 16 and the side foam members 18 may be attached and secured to the respective sides and top portions of the inner core 14. Next, the first base member 20 may be secured to a bottom surface of the inner core 14. After such occurs, the exterior design on the outer cover material 12 may be created by a heat press process onto the outer surface of the top outer surface and/or outer side surfaces of the exterior cover material 12. After any fabric design is arranged on the outer surface thereof the side fabric may be sewn first to form a band like structure and then a top seam may be used to connect the top portion of the outer cover material 12 to the side portion, thus creating a bag like outer cover material 12 for the footstool 10. Next, the outer cover material 12 may be arranged over the top and side surfaces of the interior subassembly of the footstool 10. Then, the over hang material of the outer cover material 12 may be folded in contact with and around a lip 24 arranged on the first base member 20 and then a second base member 22 may be arranged and secured within a pocket of the first base member 20 thus securing the outer cover material 12 between the first base member 20 and second base member 22. Next, a plurality of feet 32 may be arranged on a bottom surface of the footstool 10. The resulting lightweight ecologically viable footstool 10 may be capable of long term use and after such long term use it is capable of being completely recycled for use in other products.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A footstool, said footstool comprising:
    a solid expanded polystyrene foam inner core;
    a plurality of foam side panels secured to said inner core;
    a foam top member secured to a top surface of said inner core;
    a cover material arranged over said plurality of side panels and said top member;
    a first base member in contact with a bottom surface of said inner core, said first base member having a lip arranged on an outer bottom surface thereof; and
    a second base member in contact with said first base member and in contact with said cover material.

2. The footstool of claim 1 further comprising a plurality of feet connected to said first and second base member.

3. The footstool of claim 2 further comprising a screw arranged in a center portion of one of said plurality of feet, said screw interengages with said first base member and said second base member.

4. The footstool of claim 1 wherein said second base member has a square shape.

5. The footstool of claim 1 wherein said first base member has a square ring shape.

6. The footstool of claim 1 wherein said first base member is secured to said second base member by an interference fit therebetween.

7. The footstool of claim 1 wherein said cover material has a predetermined design head pressed onto an outer surface thereof.

8. The footstool of claim 1 wherein said first base member and said second base member are made of a plastic material.

9. The footstool of claim 1 further comprising a pocket arranged on a side surface of said cover material.

10. The footstool of claim 1 further comprising a strap arranged on an outer surface of the footstool.

11. The footstool of claim 1 wherein said first base member has a channel arranged therein.

12. The footstool of claim 1 wherein said second base member has a channel arranged therein.

13. The footstool of claim 1 wherein said cover material is a micro suede.

14. A method of making a footstool, said method comprising the steps of:
    forming a solid cube-shaped core from an expanded polystyrene foam;
    forming a top member and a plurality of side members from a foam;
    securing said top member and said plurality of side members to said core with an adhesive;
    forming a plastic two piece base, said base comprising a first base member and a second base member, said first base member having a lip arranged on an outer bottom surface thereof;
    securing said plastic two piece base to a bottom surface of said cube;
    securing a first fabric portion to a second fabric portion to form a bag-shaped cover material;
    placing said cover material over said top member and said plurality of side members; and
    securing said cover material to said base.

15. The method of claim 14 further comprising the step of securing a strap to a surface of said cover material.

16. The method of claim 14 further comprising the step of heat pressing a predetermined design on an outer surface of said cover material.

17. The method of claim 14 further comprising the step of securing a plurality of feet to a surface of said base.

18. The method of claim 14 wherein the step of securing said cover material further comprises said cover material being held between a surface of said first base member and a surface of said second base member.

19. The method of claim 14 further comprising the step of securing a pocket to a surface of said cover material.

* * * * *